United States Patent
Zhang et al.

(10) Patent No.: US 11,442,518 B2
(45) Date of Patent: Sep. 13, 2022

(54) EXTENDED SYSTEM, SERVER HOST AND OPERATION METHOD THEREOF

(71) Applicant: Wistron Corp., New Taipei (TW)

(72) Inventors: Zh-Wei Zhang, New Taipei (TW); Syu-Siang Lee, New Taipei (TW)

(73) Assignee: WISTRON CORP., New Taipei (TW)

( * ) Notice: Subject to any disclaimer, the term of this patent is extended or adjusted under 35 U.S.C. 154(b) by 545 days.

(21) Appl. No.: 16/516,661

(22) Filed: Jul. 19, 2019

(65) Prior Publication Data

US 2020/0333862 A1 Oct. 22, 2020

(30) Foreign Application Priority Data

Apr. 22, 2019 (TW) ................................. 108113927

(51) Int. Cl.
*G06F 1/00* (2006.01)
*G06F 1/26* (2006.01)

(52) U.S. Cl.
CPC .................. *G06F 1/266* (2013.01)

(58) Field of Classification Search
CPC . G06F 1/266; G06F 1/26; G06F 1/186; G06F 13/4022; G06F 13/4068; G06F 2213/0026
See application file for complete search history.

(56) References Cited

U.S. PATENT DOCUMENTS

| | | | |
|---|---|---|---|
| 6,591,368 B1* | 7/2003 | Ryu | H04L 12/12 713/323 |
| 10,585,816 B1* | 3/2020 | Lambert | G06F 1/3215 |
| 2006/0061951 A1* | 3/2006 | Hara | G06F 1/1626 361/679.22 |
| 2013/0054953 A1* | 2/2013 | Wu | G06F 1/32 713/2 |
| 2017/0052841 A1* | 2/2017 | Ogino | G06F 11/0745 |
| 2018/0129270 A1* | 5/2018 | Garg | G06F 1/3253 |
| 2020/0233595 A1* | 7/2020 | Hsieh | G06F 13/4221 |

FOREIGN PATENT DOCUMENTS

| | | |
|---|---|---|
| CN | CN 104052621 A | 9/2014 |
| CN | CN 104518886 A | 4/2015 |
| CN | CN 108984452 A | 12/2018 |
| TW | 201740270 A | 11/2017 |

* cited by examiner

*Primary Examiner* — Zhipeng Wang (57) ABSTRACT

An extended system includes at least one peripheral component interconnect express (PCIE) connector and a control device. The PCIE connector is suitable for connecting to at least one server device. The control device is connected to PCIE connector. According to at least one working voltage generated by the server device, the control device turns on the extended system and ignores a power control signal generated by the extended system, or the control unit generates at least one wakeup signal according to the power control signal generated by the extended system and transmits the wakeup signal to the server device, so that the server device may turn on and generate a working voltage.

18 Claims, 8 Drawing Sheets

EXTENDED SYSTEM, SERVER HOST AND OPERATION METHOD THEREOF

CROSS REFERENCE TO RELATED APPLICATIONS

This application claims priority of Taiwan Patent Application No. 108113927, filed on Apr. 22, 2019, the entirety of which is incorporated by reference herein.

BACKGROUND OF THE INVENTION

Field of the Invention

An embodiment of the present invention relates to an extended system, a server host and an operation method thereof.

Description of the Related Art

In general, server hosts may be connected to an extended system by connecting a peripheral component interconnect express (PCIE) slot to an external cable, so as to extend the function of the server host. Therefore, the designer of the system integration only needs to design the required extension functions, and the designer can design the system structure and functions using the general server method to reduce the complexity of the overall system design.

Since each of the server hosts and the extended system are independent machines, the server hosts and the extended system may each have an independent power control switch. Since the extended system and the server hosts are connected through the PCIEs, the extended system must enter a normal working state (SCPI S0) before the PCIE channel connections of the server hosts are successful. Therefore, in a traditional operation, the extended system with the PCIE needs to be turned on or off in sequence. A turning-on step is one in which the extended system is turned on, and then the server hosts connected to the extended system are turned on without in sequence. A turning-off step is one in which the server hosts connected to the extended system are first turned off without in sequence, and then the extended system is turned off.

If the above steps are violated, the turning-on step involves the server hosts being turned on first. After the initialization of the PCIE channels of the server hosts is completed, the extension system is then turned on, so that the PCIE channels of the server hosts may not be connected to the extended system. In addition, in the turning-off step, is that if the extended system firstly is turned off, the server hosts may generate a surprise down error, causing the server hosts to malfunction. This limitation causes inconvenience. Therefore, designs for the above system structure need improvement.

BRIEF SUMMARY OF THE INVENTION

An embodiment of the present invention provides an extended system, a server host and an operation method thereof, thereby ensuring that the server and the extended system may be stably connected, avoiding any sudden interruptions of the channel connection, preventing a surprise down error and increasing the convenience of use.

An embodiment of the present invention provides an extended system, which includes at least one peripheral component interconnect express (PCIE) connector and a control device. The PCIE connector is suitable to connect to at least one server device. The control device is connected to the PCIE connector. The control device is configured to turn on the extended system and ignore a power control signal generated by the extended system according to at least one working voltage generated by the server device. Alternatively, the control device is configured to generate at least one wakeup signal according to the power control signal generated by the extended system, and transmit the wakeup signal to the server device, so that the server device is turned on and generates the working voltage.

In addition, an embodiment of the present invention provides a server host, which includes at least one server and an extended system. The server includes a first PCIE connector, a power supply device and a processing device. The power supply device is connected to the first PCIE connector and is configured to provide a standby voltage and a working voltage. The processing device is connected to the first PCIE connector and the power supply device, and is configured to control the power supply device to provide the standby voltage or the working voltage according to a control signal or a wakeup signal. The extended system includes at least one second PCIE connector and a control device. The second PCIE connector is suitable to connect to the first PCIE connector of the server device. The control device is connected to the second PCIE connector. The control device is configured to turn on the extended system and ignore a power control signal generated by the extended system according to the working voltage generated by the server device. Alternatively, the control device is configured to generate the wakeup signal according to the power control signal generated by the extended system, and transmit the wakeup signal to the server device, so that the server device is turned on and generates the working voltage.

In addition, an embodiment of the present invention provides an operation method of a server host, which includes the following steps. It is detected whether at least one working voltage generated by at least one server device is received by a control device. The extended system is turned on by the control device and a power control signal generated by the extended system is ignored by the control device in response to the working voltage being received. At least one wakeup signal is generated by the control device according to the power control signal generated by the extended system in response to the working voltage not being received. The wakeup signal is transmitted to the server device, so that the server device is turned on and generates the working voltage. The server device and the extended system are connected through a PCIE connector.

According to the extended system, the server host and the operation method thereof disclosed by the embodiment of the present invention, the control device turns on the extended system and ignores the power control signal generated by the extended system according to the working voltage generated by the server device. Alternatively, according to the working voltage generated by the server device, the control device generates the wakeup signal according to the power control signal generated by the extended system, and transmits the wakeup signal to the server device. Accordingly, the server device is turned on and generates the working voltage. Therefore, the server device and the extended system are simultaneously turned on through the server device or the extended system, so as to increase the convenience of use, and the failure of the channel connection and the surprise down error may be effectively avoided.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

In each of the following embodiments, the same reference number represents the same or similar element or component.

Figure 1:
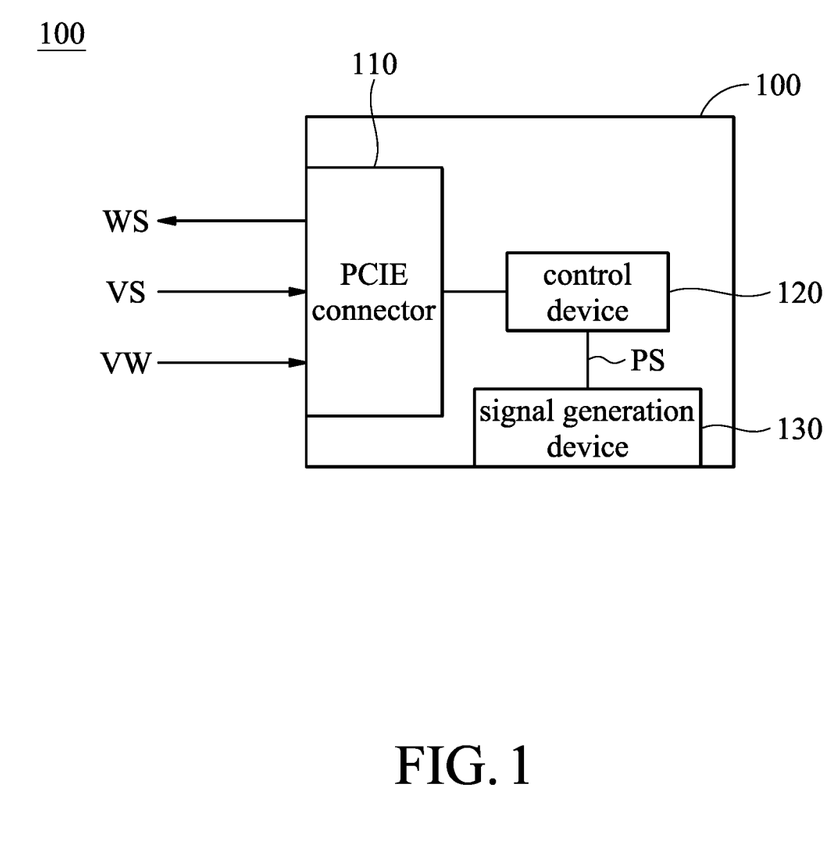
FIG. 1 shows a schematic view of an extended system according to an embodiment of the present invention.

FIG. 1 shows a schematic view of an extended system according to an embodiment of the present invention. In some embodiments, the extended system 100 is, for example, a just a bunch of flash (JBOF) system with peripheral component interconnect express (PCIE) or non-volatile memory express (NVMe). In some embodiments, the extended system 100 is, for example, a just a bunch of disk (JBOD) with PCIE or NVMe. In some embodiments, the extended system 100 is, for example, a just a bunch of graphics processing unit (GPU) with PCIE or NVMe. In some embodiments, the extended system 100 is, for example, a storage system or a general-purpose computing on graphics processing units (GPGPU) system.

Please refer to FIG. 1. The extended system 100 includes a PCIE connector 110 and a control device 120. The PCIE connector 110 is suitable to connect to a server device (not shown), so that the data and the signal between the extended system 100 and the server device may be transmitted by the PCIE connector 110.

The control device 120 is connected to the PCIE connector 110. In the embodiment, the control device 120 is, for example, a complex programmable logic device (CPLD), but the embodiment of the present invention is not limit thereto. The control device 120 may also be a microprocessor or a microcontroller.

The control device 120 may be configured to turn on the extended system 100 and ignore a power control signal PS generated by the extended system 100 according to a working voltage VW generated by the server device. Alternatively, the control device 120 may be configured to generate a wakeup signal WS according to the power control signal PS generated by the extended system 100, and transmit the wakeup signal WS to the server device, so that the server device is turned on and generates the working voltage VW.

In the embodiment, the wakeup signal WS is a WAKE #signal of a communication protocol of the PCIE connector 110.

For example, after the PCIE connector 110 is connected to the server device, the control device 120 may detect whether the working voltage VW generated by the server device is received through the PCIE connector 110. When the control device 120 detects that the working voltage VW generated by the server device is received, it indicates that the server device already operates. Accordingly, the control device 120 turns on the extended system 100 in response to receiving the working voltage VW, so that the extended system 100 starts to operate.

In addition, the control device 120 may also ignore the power control signal PS generated by the extended system 100 at the same time. That is, after the control device 120 receives the working voltage VW, if the control device 120 detects the power control signal PS, the control device 120 does not respond the power control signal PS. Therefore, when the server device and the extended system 100 are turned on at the same time, the situation in which extended system 100 is turned off to cause a surprise down error that could cause the server device to malfunction may be effectively avoided.

In the embodiment, the server device may include a central processing unit (CPU) and the CPU needs to load a basic input/output system (BIOS) program code. In practice, a required time for loading the BIOS code by the server device is greater than thirty seconds it takes more than 30 seconds for the server device to load the BIOS code. The expansion system 100 does not include the central processing unit. Since the server device needs to load the BIOS code after it is turned on, a turning-on process of the extended system 100 may be faster than a turning-on process of the server device. That is, although the extended system 100 is turned on when receiving the working voltage VW generated by the server device, the extended system 100 is already turned on when the server device scans the PCIE bus, so that the connection of the PCIE channel is successful. Therefore, the failure of the PCIE channel connection may not occurred in the embodiment.

On the other hand, when the control device 120 detects that the working voltage VW generated by the server device is not received, it indicates that the server device does not operate. Accordingly, the control device 120 may detect whether the power control signal PS generated by the extended system 100 in response to not receiving the working voltage VW. When the control device 120 detects that the power control signal PS is not received, the control device 120 does not generate any operation. That is, the control device 120 may not turn on the extended system 100.

On the other hand, when the control device 120 detects that the power control signal PS is received, the control device 120 may generate the wakeup signal WS according to the power control signal PS. Then, the control device 120 transmits the wakeup signal WS to the server device through the PCIE connector 110, so that the server device is turned on according to the wakeup signal WS and generates the working voltage VW.

At this time, the control device 120 may detect that the working voltage VW generated by the server device is received, it indicates that the server device already operates. Accordingly, the control device 120 may turn on the extended system 100 in response to receiving the working voltage VW, so that the extended system 100 starts to operate. In addition, the control device 120 may also ignore the power control signal PS generated by the extended system 100, so as to avoid the situation in which the extended system 100 is turned off to cause the surprise down error.

Therefore, in the embodiment of present invention, the server device and the extended system 100 are turned on at the same time through the server device or the extended system 100, and the server device and the extended system 100 may be simultaneously turned on without turning on in sequence, so as to increase the convenience of use.

Furthermore, in the embodiment, the control device 120 may detect a standby voltage VS generated by the server device to determine whether the PCIE connector 110 is connected to the server device. When the control device 120 detects that the standby voltage VS is received, the control device 120 may determines that the PCIE connector 110 is connected to the server device in response to receiving the standby voltage VS. Then, the control device 120 may perform the subsequent operations according to the working voltage VW generated by the server device as described above.

On the other hand, when the control device 120 detects that the standby voltage VS is not received, the control device 120 may determine that the PCIE connector 110 is not connected to server device in response to not receiving the standby voltage VS. Then, the control device 120 may further turn on or turn off the extended system 100 according to the power control signal PS generated by the extended system 100.

In addition, the extended system 100 further includes a signal generation device 130. The signal generation device 130 is connected to the control device 120 and generates the power control signal PS. In the embodiment, the signal generation device 130 is, for example, a power button. That is, the user may operate (press) the signal generation device 130 to generate the corresponding power control signal PS.

For example, when the PCIE connector 110 is not connected to the server device, the user operates (presses) the signal generation device 130 to generate the power control signal PS, so that the control device 120 turns on the extended system 100 according to the power control signal PS. Afterward, the user operates (presses) the signal generation device 130 again to generate the power control signal PS, so that the control device 120 turns off the extended system 100 according to the power control signal PS.

In addition, when the PCIE connector 110 is connected to the server device and the control device 120 receives the working voltage VW, the control device 120 may turn on the extended system 100 and ignore the power control signal PS. That is, the control device 120 disables the operation of the signal generation device 130. At this time, when the user operates (presses) the signal generation device 130 to generate the power control signal PS, the control device 120 may ignore the power control signal PS and does not generate any operation. That is, the control device 120 may not turn off the extended system 100.

Then, when the server device is turned off, the server device does not generate the working voltage VW. At this time, since the control device 120 detects that the working voltage VW is not received, the control device 120 may turn off the extended system 100 accordingly. Therefore, when the server device and the extended system 100 are simultaneously turned on, the server device is firstly turned off and then the extend system is turned off, but the extended system 100 is not directly turned off, thereby effectively avoiding the situation in which the extended system 100 is turned off to cause the surprise down error.

Figure 2:
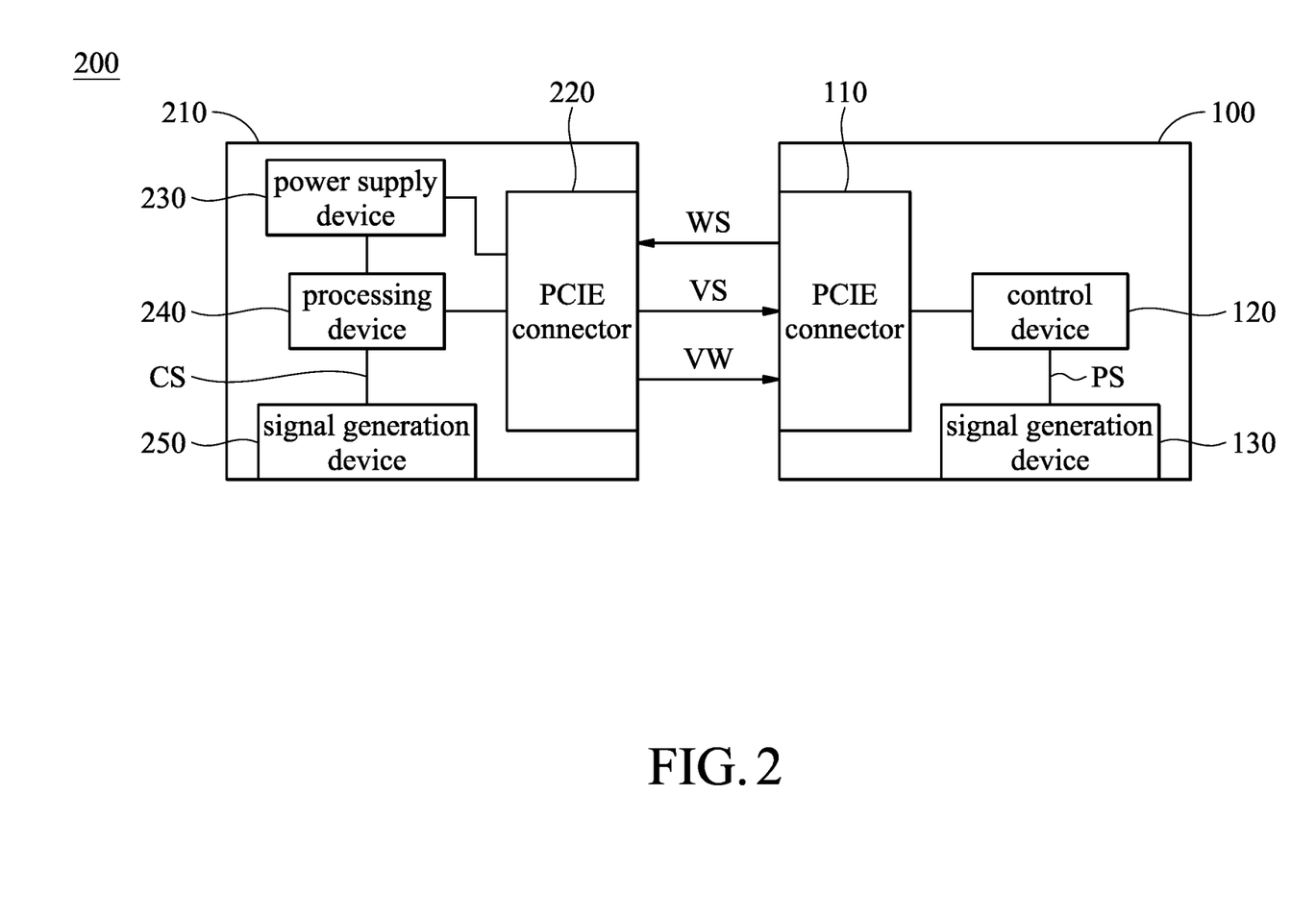
FIG. 2 shows a schematic view of a server host according to an embodiment of the present invention.

FIG. 2 shows a schematic view of a server host according to an embodiment of the present invention. The server host 200 includes a server device 210 and an extended system 100. The extended system 100 includes a PCIE connector 110, a control device 120 and a signal generation device 130. In the embodiment, the PCIE connector 110, the control device 120 and the signal generation device 130 in FIG. 2 are identical to or similar to the PCIE connector 110, the control device 120 and the signal generation device 130 in FIG. 1. The PCIE connector 110, the control device 120 and the signal generation device 130 in FIG. 2 may refer to the description of the embodiment in FIG. 1, and the description thereof is not repeated herein.

The server device 210 includes a PCIE connector 220, a power supply device 230 and a processing device 240. The PCIE connector 220 is suitable to connect to the PCIE connector 110, so as to transmit the signal between the server device 210 and the extended system 100.

The power supply device 230 is connected to the PCIE connector 220. The power supply device 230 is configured to provide a standby voltage VS and a working voltage VW. The standby voltage VS and the working voltage VW may be outputted to the PCIE connector 110 through the PCIE connector 220.

The processing device 240 is connected to the PCIE connector 220 and the power supply device 230. The processing device 240 is configured to control the power supply device 230 to provide the standby voltage VS or the working voltage VW according to a control signal CS or a wakeup signal WS.

For example, when the server device 210 is not powered on, the processing device 240 controls, for example, the power supply device 230 to provide the standby voltage VS, so that the server device 210 in a standby mode. Then, when the processing device 240 receives the control signal CS, the processing device 240 may control the power supply device 230 to provide the working voltage VW, and turn on the server device 210. After the server device 210 is turned on, when the processing device 240 receives the control signal CS again, the processing device 240 may control the power supply device 230 to provide the standby voltage VS and stop providing the working voltage VW, so as to turn off the server device 210. Accordingly, the server device 210 enters the standby mode.

In addition, when the processing device 240 receives the wakeup signal WS, the processing device 240 may control the power supply device 230 to provide the working voltage VW, and turn on the server device 210. After the server device 210 is turned on, when the processing device 240 receives the control signal CS, the processing device 240 may control the power supply device 230 to provide the standby voltage VS and stop providing the working voltage VW, so as to turn off the server device 210. Accordingly, the server device 210 enters the standby mode.

In addition, the server device 210 further includes a signal generation device 250. The signal generation device 250 is connected to the processing device 240 and is configured to generate the control signal CS. Accordingly, the processing device 240 controls the power supply device 230 to generate the standby voltage VS or the working voltage VW according to the control signal CS. In the embodiment, the signal generation device 250 is also, for example, a power button.

For example, the user may operate (press) the signal generation device 250 to generate the control signal CS. Accordingly, the processing device 240 controls the power supply device 230 to generate the working voltage VW according to the control signal CS. Afterward, the user operates (presses) the signal generation device 250 again to generate the control signal CS, so that the processing device 240 controls the power supply device 230 to generate the standby voltage VS according to the control signal CS.

Figure 3:
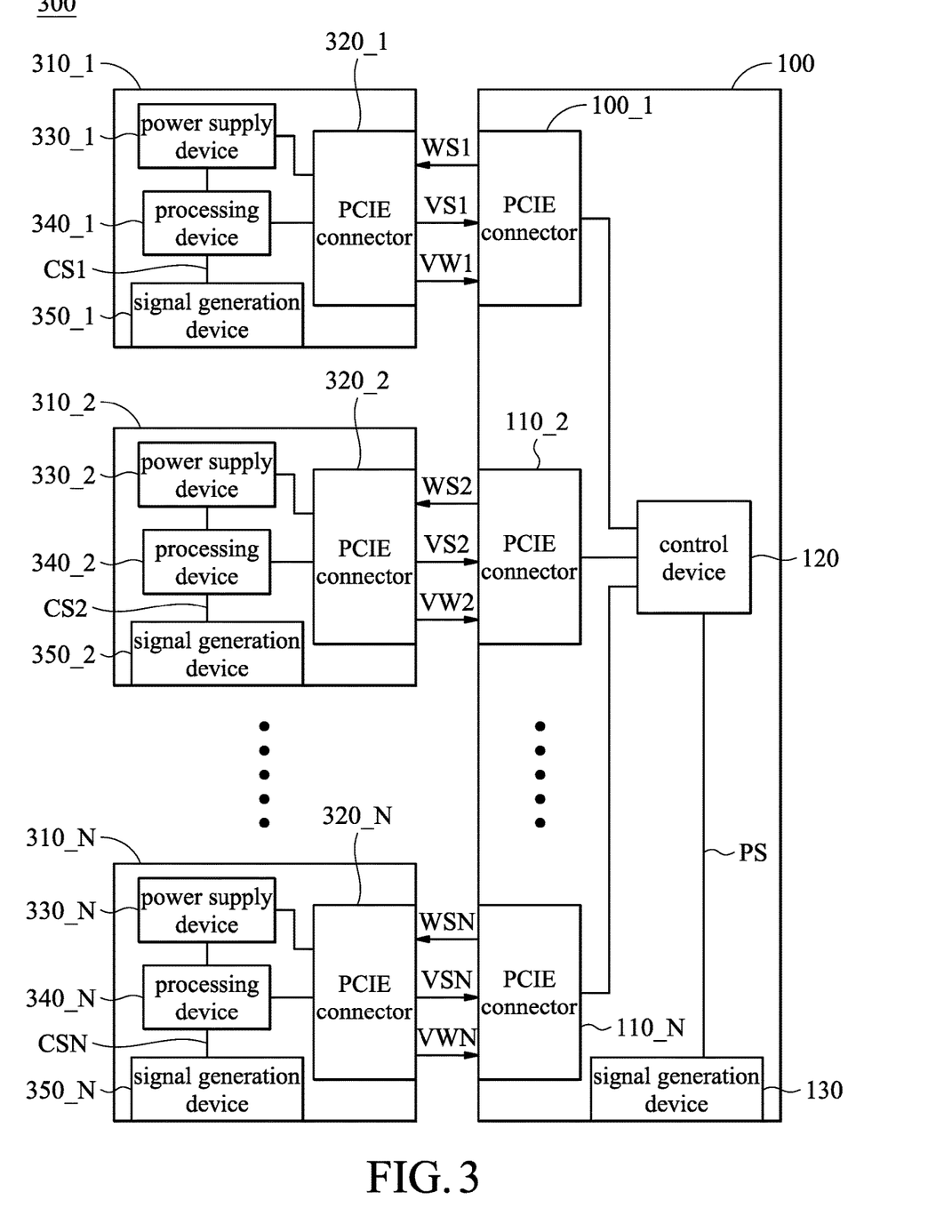
FIG. 3 shows a schematic view of a server host according to another embodiment of the present invention.

FIG. 3 shows a schematic view of a server host according to an embodiment of the present invention. The server host 300 includes a plurality of server devices 310_1 to 310_N and an extended system 100, wherein N is a positive integer greater than 1. The extended system 100 includes a plurality of PCIE connectors 110_1 to 110_N, a control device 120 and a signal generation device 130. The PCIE connectors 110_1 to 110_N are correspondingly connected to the server devices 310_1 to 310_N. For example, the PCIE connector 110_1 is connected to the server device 310_1, the PCIE connector 110_2 is connected to the server device 310_2, . . . , and the PCIE connector 110_N is connected to the server device 310_N. The control device 120 and the signal generation device 130 in the embodiment are identical to or similar to the control device 120 and the signal generation device 130 in FIG. 1. Accordingly, the control device 120 and the signal generation device 130 in the embodiment may refer to the description of the embodiment in FIG. 1, and the description thereof is not repeated herein. In addition, in the embodiment, the server devices 310_1 to 310_N are identical to or similar to the server device 210 in FIG. 2, and internal components and coupling relationship thereof of the devices 310_1 to 310_N are identical to or similar to that of the server device 210 in FIG. 2. Accordingly, the server devices 310_1 to 310_N may refer to the description of the embodiment in FIG. 2, and the description thereof is not repeated herein.

In the embodiment, after the PCIE connectors 110_1 to 110_N are connected to the server devices 310_1 to 310_N, the control device 120 may detect whether one of the working voltages VW1 to VWN generated by the server device 310_1 to 310_N is received through the PCIE connectors 110_1 to 110_N. When the control device 120 detects that one (such as the working voltage VW1) of the working voltages VW1 to VWN is received, it indicates that the server device 310_1 already operates. Then, the control device 120 turns on the extended system 100 and ignores the power control signal PS generated by the extended system 100 in response to receiving one (such as the working voltage VW1) of the voltage voltages VW1 to VWN. Accordingly, the extended system 100 starts to operate. At the same time, the control device 120 may also generate remaining wakeup signals WS2 to WSN to the remaining processing devices 340_2 to 340_N according to one (such as the working voltage VW1) of the working voltages VW1 to VWN. Accordingly, the remaining server devices 310_2 to 310_N are turned on.

On the other hand, when the control device 120 detects that the power control signal PS is received, the control device 120 may generate the wakeup signals WS1 to WSN according to the power control signal PS. Then, the control device 120 transmits the wakeup signals WS1 to WSN to the server devices 310_1 to 310_N through the PCIE connectors 110_1 to 110_N. Accordingly, the server devices 310_1 to 310_N are turned on according to the wakeup signals WS1 to WSN and generate the working voltages VW1 to VWN.

At this time, the control device 120 may detect that the working voltages VW1 to VWN generated by the server devices 310_1 to 310_N, it indicates that the server devices 310_1 to 310_N already operate. Then, the control device 120 may turn on the extended system 100 in response to receiving the working voltages VW1 to VWN, so that the extended system 100 starts to operate. In addition, the control device 120 may also ignore the power control signal PS generated by the extended system 100 at the same time, so as to avoid a situation in which the extended system 100 is turned off to cause the surprise down error.

Furthermore, the control device 120 further determines whether the control device 120 already operates. When determining that the control device 120 already operates, the control device 120 may determine whether the working voltages VW1 to VWN exist in response to the control device 120 already operating. When the working voltages VW1 to VWN do not exist, it indicates that the server devices 310_1 to 310_N are turned off. Accordingly, the control device 120 may turn off the extended system 100 in response to determining that the working voltages VW1 to VWN do not exist.

On the other hand, when one (such as the working voltage VW1) of the working voltages VW1 to VWN exists, it indicates that the server device 310_1 already operates and the server devices 310_2 to 310_N are turned off. At this time, the control device 120 may determine whether the remaining server devices 310_2 to 310_N have turning-on records in response to determining that the one (such as the working voltage VW1) of the working voltages VW1 to VWN exists. In the embodiment, the turning-on records indicate that the server devices have been turned on but are turned off now, and the turning-on records are stored in a storage device of the control device 120.

When determining that the remaining server devices 310_2 to 310_N have turning-on records, it indicates that the server devices 310_2 to 310_N have been turned on but are turned off now. At this time, the control device 120 may not operate in response to determining that the server devices 310_2 to 310_N have turning-on records. That is, the control device 120 may not generate the wakeup signals WS2 to WSN to the server devices 310_2 to 310_N. Therefore, the embodiment may avoid turning on again the server device that is already turned off.

On the other hand, when determining that the remaining server devices 310_2 to 310_N do not have the turning records, it indicates that the server devices 310_2 to 310_N have never been turned on. At this time, the control device 120 may generate the wakeup signals WS2 to WSN to the processing devices 340_2 to 340_N of the remaining server devices 310_2 to 310_N in response to determining that the remaining server devices 310_2 to 310_N do not have turning-on records. Accordingly, the remaining server devices 310_2 to 310_N are turned on, and the power supply devices 330_2 to 330_N provide the working voltages VW2 to VWN.

Furthermore, the control device 120 may detect the standby voltages VS1 to VSN generated by the server devices 310_1 to 310_N to determine whether the PCIE connectors 110_1 to 110_N are connected to the PCIE connectors 320_1 to 320_N of the server devices 310_1 to 310_N. When the control device 120 detects that the standby voltages VS1 to VSN are received, the control device 120 may determine that the PCIE connectors 110_1 to 110_N are connected to the PCIE connectors 320_1 to 320_N of the server devices 310_1 to 310_N in response to the standby voltages VS1 to VSN being received. Then, the control device 120 may perform the subsequent operations according to the working voltages VW1 to VWN generated by the server devices 310_1 to 310_N as described above.

On the other hand, when the control device 120 detects that the standby voltages VS1 to VSN are not received, the control device 120 may determine that the PCIE connectors 110_1 to 110_N are not connected to the PCIE connectors 320_1 to 320_N of the server devices 310_1 to 310_N in response to the standby voltages VS1 to VSN not being received. Then, the control device 120 may further turn on or turn off the extended system 100 according to the power control signal PS generated by the extended system 100.

Figure 4:
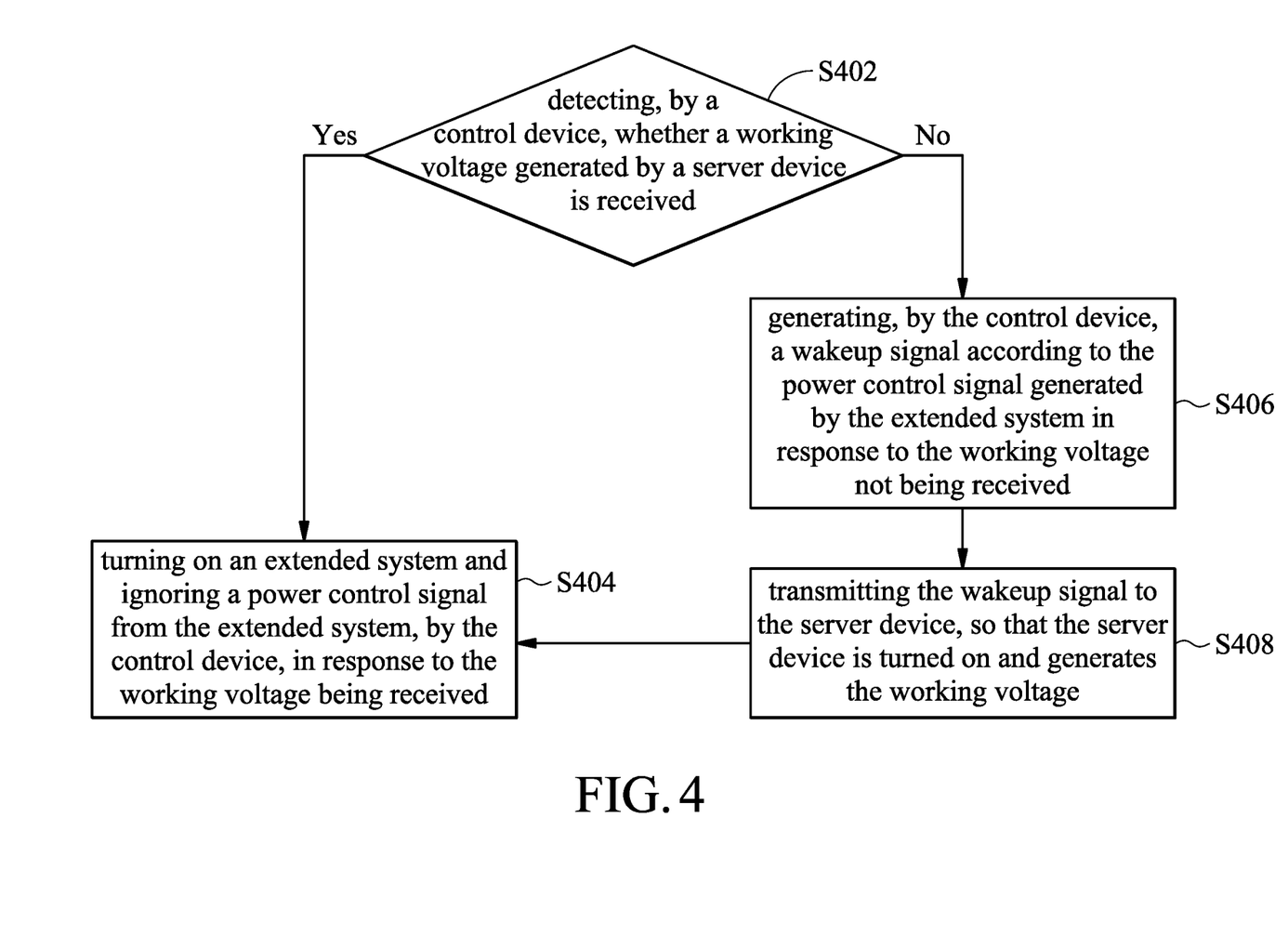
FIG. 4 shows a flowchart of an operation method of a server host according to an embodiment of the present invention.

According to the above-mentioned description, the embodiment of the present invention additionally provides an operation method of a server host. FIG. 4 shows a flowchart of an operation method of a server host according to an embodiment of the present invention. In step S402, the method involves detecting, by a control device, whether a working voltage generated by a server device is received. When detecting that the working voltage generated by the server device is received, the method performs step S404. In step S404, the method involves turning on an extended system and ignoring a power control signal from the extended system, by the control device, in response to the working voltage being received.

When detecting that the working voltage generated by the server device is not received, the method performs step S406. In step S406, the method involves generating, by the control device, a wakeup signal according to the power control signal generated by the extended system in response to the working voltage not being received. In step S408, the method involves transmitting the wakeup signal to the server device, so that the server device is turned on and generates the working voltage. Then, the method performs step S404. In the embodiment, the server device and the extended system are connected through a PCIE connector. In addition, the control device is, for example, a complex programmable logic device.

Figure 5:
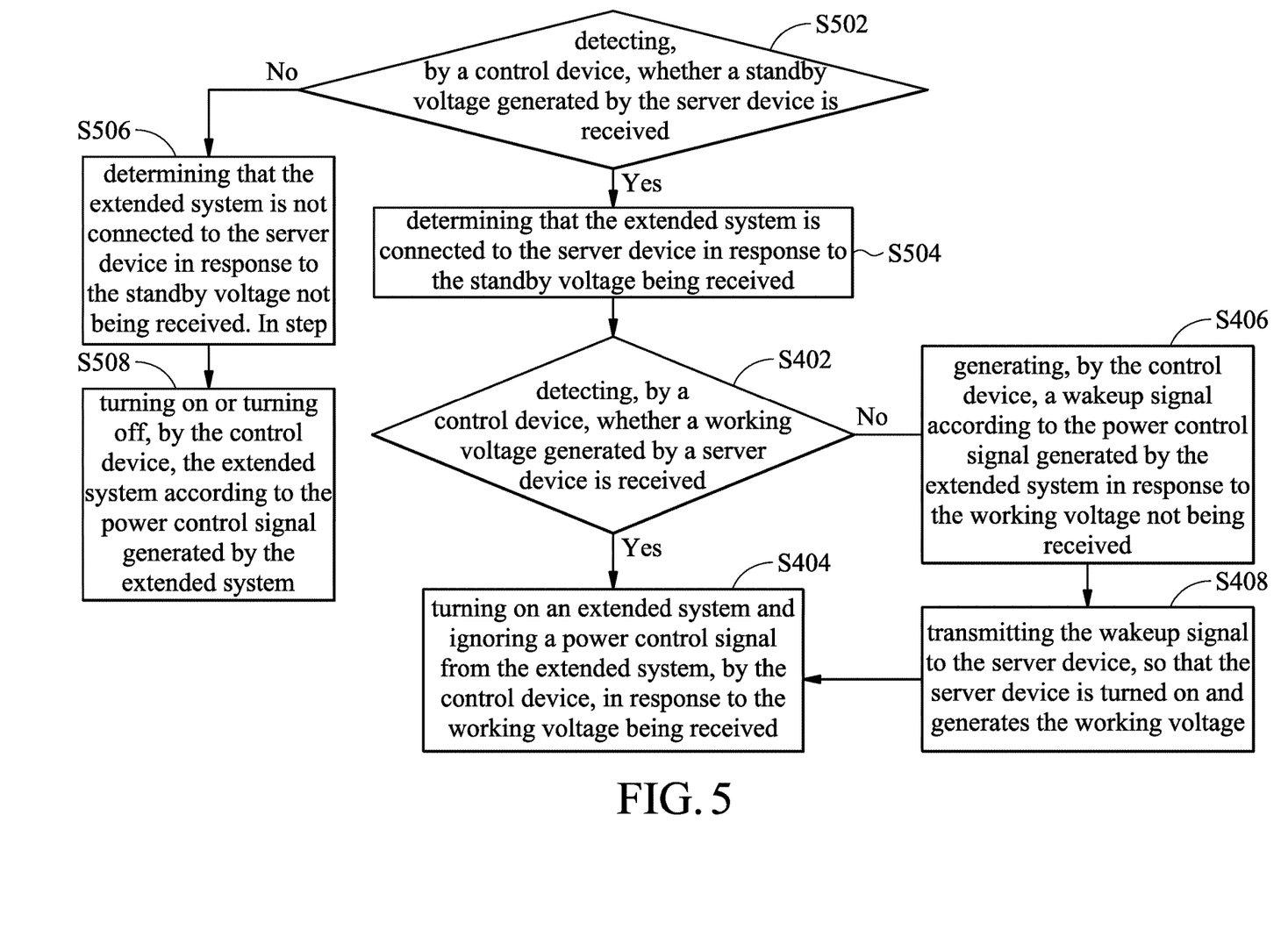
FIG. 5 shows a flowchart of an operation method of a server host according to another embodiment of the present invention.

FIG. 5 shows a flowchart of an operation method of a server host according to another embodiment of the present invention. In the embodiment, steps S402 to S408 in FIG. 5 are identical to or similar to steps S402 to S408 in FIG. 4. The description of steps S402 to S408 in FIG. 5 may refer to the description of the embodiment in FIG. 4, and the description thereof is not repeated herein.

In step S502, the method involves detecting, by a control device, whether a standby voltage generated by the server device is received. When detecting that the standby voltage generated by the server device is received, the method performs step S504. In step S504, the method involves determining that the extended system is connected to the server device in response to the standby voltage being received. After step S504 is performed, the method performs steps S402 to S408.

On the other hand, when detecting that the standby voltage generated by the server device is not received, the method performs step S506. In step S506, the method involves determining that the extended system is not connected to the server device in response to the standby voltage not being received. In step S508, the method involves turning on or turning off, by the control device, the extended system according to the power control signal generated by the extended system. In the embodiment, the server device and the extended system are connected through a PCIE connector. In addition, the control device is, for example, a complex programmable logic device.

Figure 6:
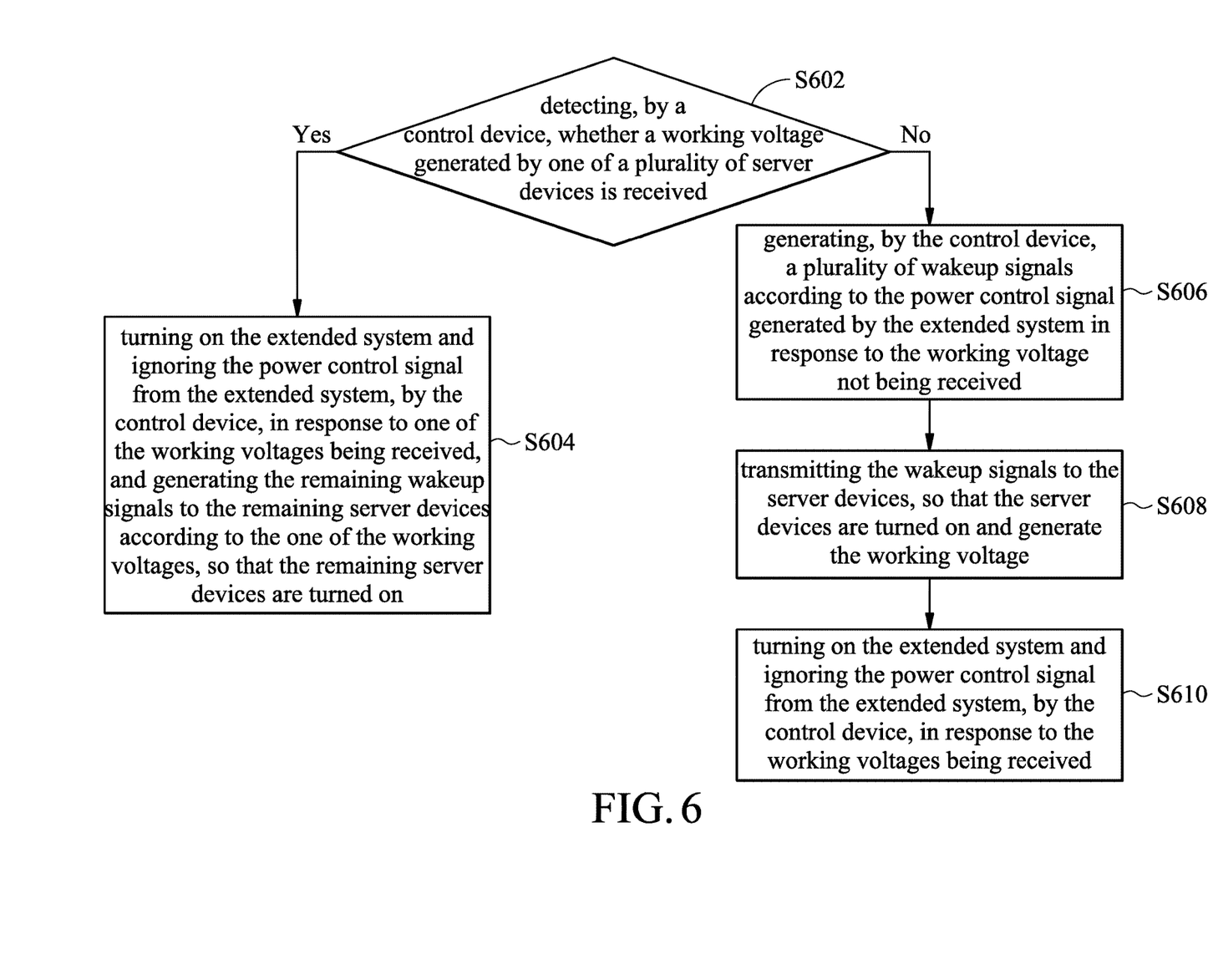
FIG. 6 shows a flowchart of an operation method of a server host according to another embodiment of the present invention.

FIG. 6 shows a flowchart of an operation method of a server host according to another embodiment of the present invention. In step 602, the method involves detecting, by a control device, whether a working voltage generated by one of a plurality of server devices is received. When detecting that the working voltage generated by one of the server devices is received, the method performs step S604. In step S604, the method involves turning on the extended system and ignoring the power control signal from the extended system, by the control device, in response to one of the working voltages being received, and generating the remaining wakeup signals to the remaining server devices according to the one of the working voltages, so that the remaining server devices are turned on.

When detecting that the working voltage generated by one of the server devices is not received, the method performs step S606. In step S606, the method involves generating, by the control device, a plurality of wakeup signals according to the power control signal generated by the extended system in response to the working voltage not being received. In step S608, the method involves transmitting the wakeup signals to the server devices, so that the server devices are turned on and generate the working voltage. In step S610, the method involves turning on the extended system and ignoring the power control signal from the extended system, by the control device, in response to the working voltages being received. In the embodiment, the server device and the extended system are connected through a plurality of PCIE connectors. In addition, the control device is, for example, a complex programmable logic device.

Figure 7A:
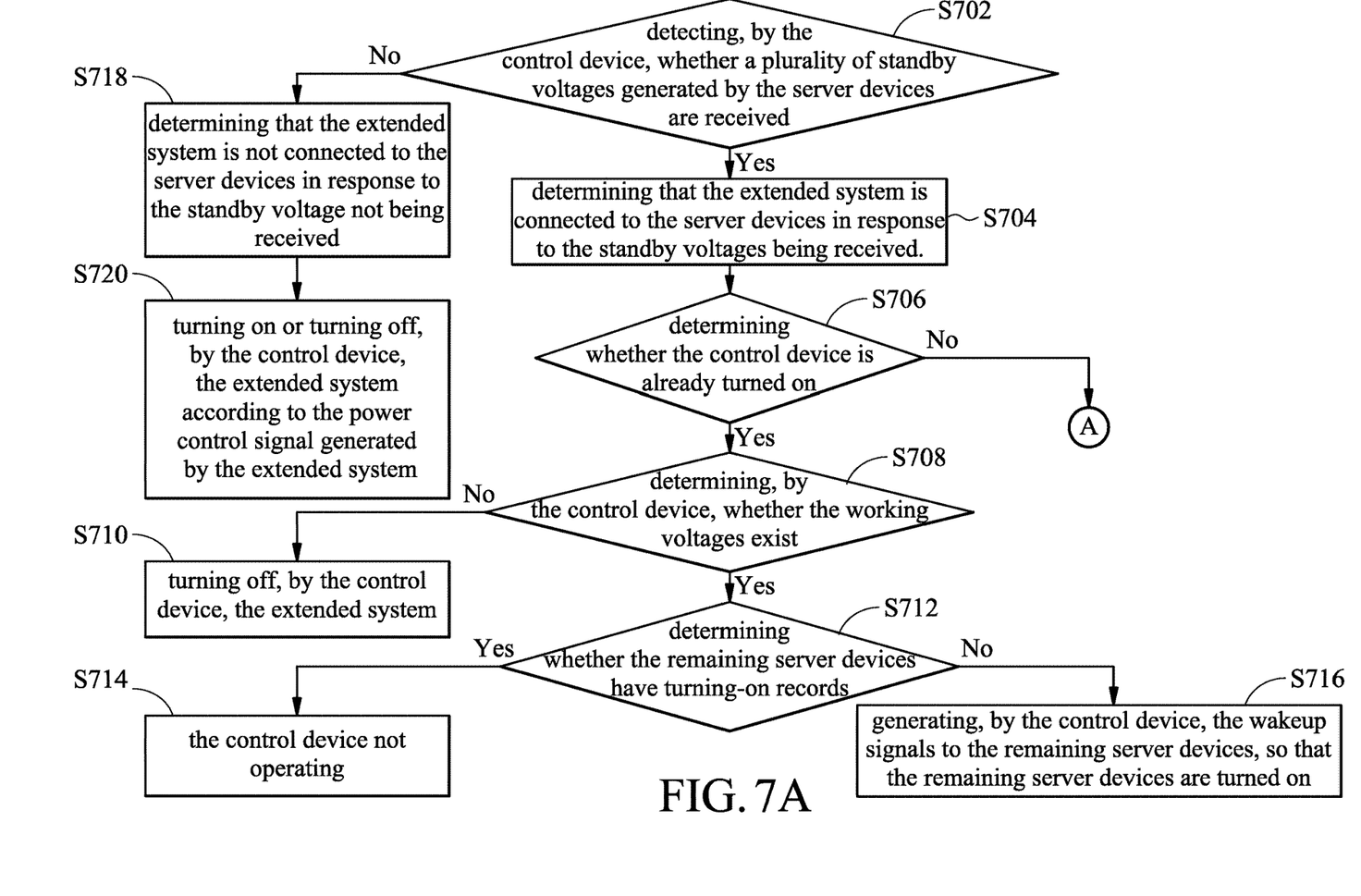
FIGS. 7A and 7B show a flowchart of an operation method of a server host according to another embodiment of the present invention.
Figure 7B:
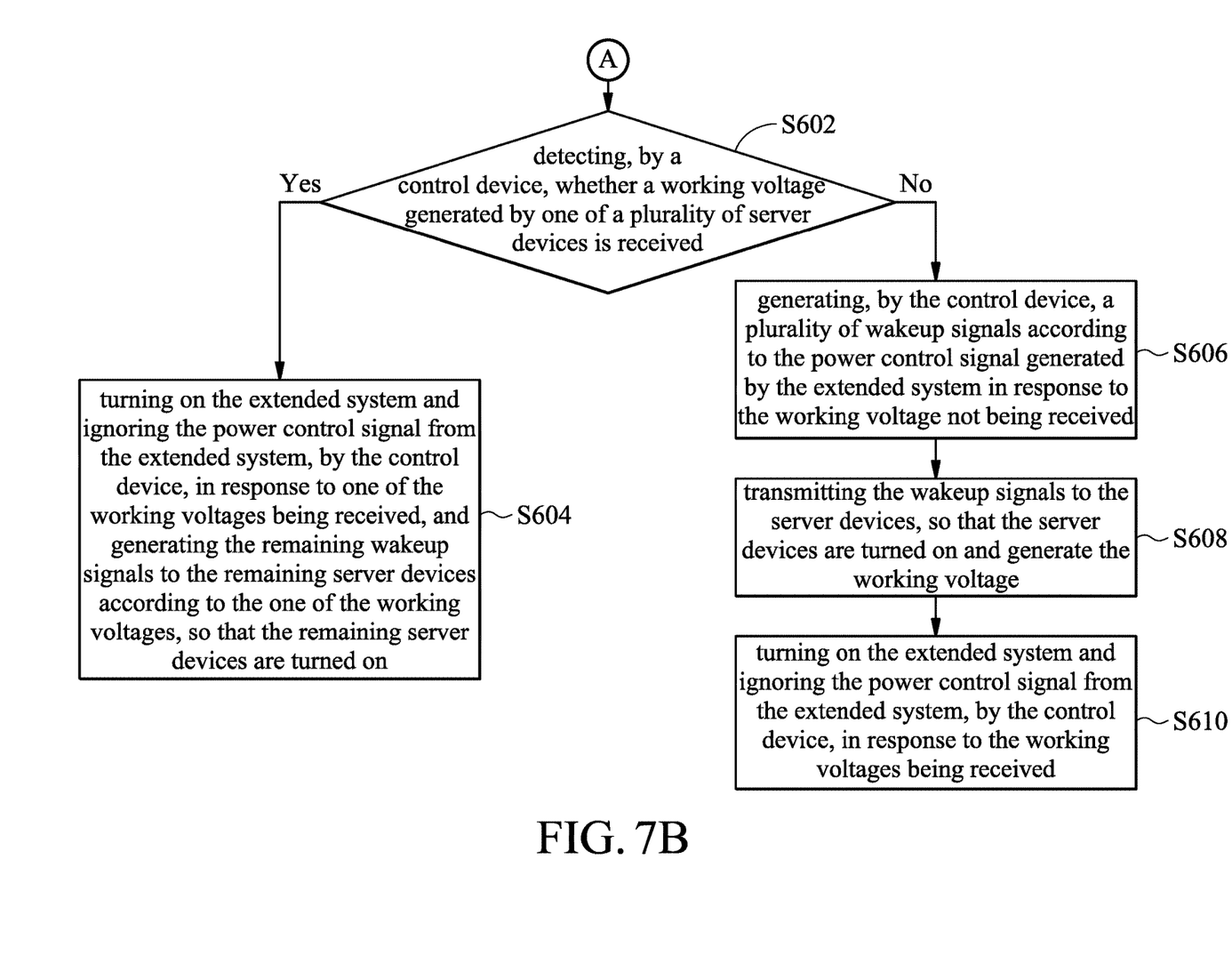

FIGS. 7A and 7B show a flowchart of an operation method of a server host according to another embodiment of the present invention. In the embodiment, steps S602 to S610 in FIG. 7B are identical to or similar to steps S602 to S610 in FIG. 6. The description of steps S602 to S610 in FIG. 7B may refer to the description of the embodiment in FIG. 6, and the description thereof is not repeated herein.

In step S702, the method involves detecting, by the control device, whether a plurality of standby voltages generated by the server devices are received. When detecting that the standby voltages generated by the server devices, the method performs step S704. In step S704, the method involves determining that the extended system is connected to the server devices in response to the standby voltages being received.

In step S706, the method involves determining whether the control device is already turned on. When determining that the control device is already turned on, the method performs step S708. In step S708, the method involves determining, by the control device, whether the working voltages exist in response to determining that the control device is already turned on. When determining that the working voltages do not exist, the method performs step S710. In step S710, the method involves turning off, by the control device, the extended system in response to determining that the working voltages do not exist. When determining that one of the working voltages does exist, the method performs step S712. In step S712, the method involves determining whether the remaining server devices have turning-on records in response to determining that one of the working voltages exists. When determining that the remaining server devices have turning-on records, the method performs step S714 in response to determining that the remaining server devices have turning-on records. In step S714, the method involves the control device not operating. When determining that the remaining server devices do not have turning-on records, the method performs step S716. In step S716, the method involves generating, by the control device, the wakeup signals to the remaining server devices, so that the remaining server devices are turned on.

Continuing to step S706, when determining that the control device is not turned on, the method performs steps S602 to S610. In addition, continuing to step S702, when detecting that the standby voltages generated by the server devices are not received, the method performs step S718. In step S718, the method involves determining that the extended system is not connected to the server devices in response to the standby voltage not being received. In step S720, the method involves turning on or turning off, by the control device, the extended system according to the power control signal generated by the extended system. In the embodiment, the server devices and the extended system are connected through PCIE connectors. In addition, the control device is, for example, a complex programmable logic device.

In summary, according to the extended system, the server host and the operation method thereof, the control device turns on the extended system and ignores the power control signal generated by the extended system according to the working voltage generated by the server device. Alternatively, according to the working voltage generated by the server device, the control device generate the wakeup signal according to the power control signal generated by the extended system, and transmits the wakeup signal to the server device. Accordingly, the server device is turned on and generates the working voltage. In addition, in the embodiment of the present invention, when the server device includes a plurality of server devices, the control device further turns on the extended system and ignores the power control signal generated by the extended system according to one of the working voltages generated by the server devices. At the same time, the control device generates the wakeup signals to the remaining server devices according to the working voltages, so that the remaining server devices are turned on. Therefore, any server devices and the extended system are simultaneously turned on through the server device or the extended system, so as to increase the convenience of use, and the failure of the channel connection and the surprise down error may be effectively avoided.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:
1. An extended system, comprising:
at least one peripheral component interconnect express (PCIE) connector, suitable to connect to at least one server device; and
a control device, connected to the at least one PCIE connector;
wherein the control device is configured to:
detect whether a working voltage generated by the at least one server device is received,
in response to the working voltage being received, turn on the extended system and ignore a power control signal generated by the extended system, and
in response to the working voltage not being received, generate at least one wakeup signal according to the power control signal generated by the extended system, and transmit the at least one wakeup signal to the at least one server device, so that the at least one server device is turned on and generates the at least one working voltage.

2. The extended system as claimed in claim 1, wherein the control device determines that the PCIE connector is connected to the at least one server device in response to receiving at least one standby voltage of the at least one server device.

3. The extended system as claimed in claim 2, wherein the control device determines that the PCIE connector is not connected to the at least one server device in response to not receiving the at least one standby voltage, and the control device further turns on or turns off the extended system according to the power control signal generated by the extended system.

4. The extended system as claimed in claim 1, wherein the at least one PCIE connector comprises a plurality of PCIE connectors, the at least one server device comprises a plurality of server devices, and the PCIE connectors are connected to the corresponding server devices,
wherein the control device turns on the extended system and ignores the power control signal generated by the extended system according to one of the working voltages generated by the server device;
wherein the control device generates the remaining wakeup signals to the remaining server devices according to the one of the working voltages, so that the remaining server devices are turned on; or
wherein the control device generates the wakeup signals according to the power control signal generated by the extended system, and transmits the wakeup signals to the server devices, so that the server devices are turned on and generate the working voltage.

5. The extended system as claimed in claim 4, wherein the control device determines whether the working voltages exist in response to determining that the control device is already turned on;
wherein the control device turns off the extended system in response to determining that the working voltages do not exist;
wherein the control device determines whether the remaining server devices have turning-on records in response to one of the working voltages existing;
wherein the control device does not operate in response to determining that the remaining server devices have turning-on records;
wherein the control device generates the remaining wakeup signals to the remaining server devices in response to determining that the remaining server devices do not have turning-on records, so that the remaining server devices are turned on.

6. The extended system as claimed in claim 4, wherein the control device further determines that the PCIE connector is connected to the server devices in response to receiving a plurality of standby voltages of the server devices.

7. The extended system as claimed in claim 6, wherein the control device determines that the PCIE connector is not connected to the server devices in response to not receiving the standby voltages, and the control device further turns on or turns off the extended system according to the power control signal generated by the extended system.

8. The extended system as claimed in claim 1, further comprising:
a signal generation device, connected to the control device, and configured to generate the power control signal.

9. The extended system as claimed in claim 1, wherein the control device is a complex programmable logic device.

10. A server host, comprising:
at least one server, comprising:
a first PCIE connector;
a power supply device, connected to the first PCIE connector, and configured to provide a standby voltage and a working voltage; and
a processing device, connected to the first PCIE connector and the power supply device, and configured to control the power supply device to provide the standby voltage or the working voltage according to a control signal or a wakeup signal; and
an extended system, comprising:
at least one second PCIE connector, suitable to connect to the first PCIE connector of the at least one server device; and
a control device, connected to the at least one second PCIE connector;
wherein the control device is configured to:
detect whether a working voltage generated by the at least one server device is received,
in response to the working voltage being received, turn on the extended system and ignore a power control signal generated by the extended system according to the working voltage generated by the power supply device, and
in response to the working voltage not being received, generate the wakeup signal according to the power control signal generated by the extended system, and transmit the wakeup signal to the processing device, so that the at least one server device is turned on and the power supply device generates the working voltage.

11. An operation method of a server host, comprising:
detecting, by a control device, whether at least one working voltage generated by at least one server device is received;
turning on an extended system and ignoring a power control signal from the extended system, by the control device, in response to the at least one working voltage being received;
generating, by the control device, at least one wakeup signal according to the power control signal generated by the extended system in response to the at least one working voltage not being received; and
transmitting the at least one wakeup signal to the at least one server device, so that the at least one server device is turned on and generates the at least one working voltage;
wherein the at least one server device and the extended system are connected through a PCIE connector.

12. The operation method of the server host as claimed in claim 11, further comprising:
detecting, by the control device, whether at least one standby voltage generated by the at least one server device is received; and
determining that the extended system is connected to the at least one server device in response to the at least one standby voltage being received.

13. The operation method of the server host as claimed in claim 12, further comprising:
determining that the extended system is not connected to the at least one server device in response to the at least one standby voltage not being received; and
turning on or turning off, by the control device, the extended system according to the power control signal generated by the extended system.

14. The operation method of the server host as claimed in claim 11, wherein the at least one server device comprises a plurality of server devices, and the operation method further comprises:
turning on the extended system and ignoring the power control signal from the extended system, by the control device, in response to one of the working voltages being received, and generating the wakeup signals to the remaining server devices according to the one of the working voltages, so that the remaining server devices are turned on.

15. The operation method of the server host as claimed in claim 14, further comprising:
determining whether the control device is already turned on;
determining, by the control device, whether the working voltages exist in response to determining that the control device is already turned on;
turning off, by the control device, the extended system in response to determining that the working voltages do not exist;
determining whether the remaining server devices have turning-on records in response to determining that one of the working voltages exists;
the control device not operating in response to determining that the remaining server devices have turning-on records; and
generating, by the control device, the wakeup signals to the remaining server devices in response to determining that the remaining server devices do not have turning-on records, so that the remaining server devices are turned on.

16. The operation method of the server host as claimed in claim 11, further comprising:
detecting, by the control device, whether a plurality of standby voltages generated by the server devices are received; and
determining that the extended system is connected to the server devices in response to the standby voltages being received.

17. The operation method of the server host as claimed in claim 16, further comprising:
determining that the extended system is not connected to the server devices in response to the standby voltages not being received;
turning on or turning off, by the control device, the extended system according to the power control signal generated by the extended system.

18. The operation method of the server host as claimed in claim 11, wherein the control device is a complex programmable logic device.

* * * * *